United States Patent [19]

Mercer, Jr. et al.

[11] Patent Number: 5,484,632
[45] Date of Patent: Jan. 16, 1996

[54] NON-ORIENTED, HEAT-SEALING POLYESTER FILM

[75] Inventors: James W. Mercer, Jr., Kingsport; Emily T. Bell, Jonesborough; Wayne K. Shih, Kingsport, all of Tenn.

[73] Assignee: Eastman Chemical Company, Kingsport, Tenn.

[21] Appl. No.: 133,550

[22] Filed: Oct. 7, 1993

[51] Int. Cl.⁶ .................. B32B 27/36; B32B 27/06; C08G 63/183; C08G 63/199
[52] U.S. Cl. .................. 428/35.7; 428/36.92; 428/213; 428/349; 428/354; 428/355; 428/480; 528/307; 528/308.7
[58] Field of Search .................. 428/480, 483, 428/323, 347, 349, 354, 35.7, 36.8, 36.9, 36.91, 36.92, 35.2, 35.5, 212, 213, 355; 528/308, 308.1, 308.7, 308.6, 272, 289, 208, 176, 190, 307

[56] References Cited

U.S. PATENT DOCUMENTS

| | | | |
|---|---|---|---|
| 2,901,466 | 8/1959 | Kibler et al. | 260/75 |
| 4,011,358 | 3/1977 | Roelofs | 428/287 |
| 4,091,150 | 5/1978 | Roelofs | 428/57 |
| 4,373,002 | 2/1983 | Petersen-Høj | 428/213 |
| 4,375,494 | 3/1983 | Stokes | 428/323 |
| 4,399,179 | 8/1983 | Minami | 428/212 |
| 4,405,400 | 9/1983 | Petersen-Høj | 156/244.11 |
| 4,447,595 | 5/1984 | Smith et al. | 528/274 |
| 4,765,999 | 8/1988 | Winter | 426/113 |
| 4,946,743 | 8/1990 | Winter | 428/249 |
| 5,059,470 | 10/1991 | Fukuda et al. | 428/142 |
| 5,059,962 | 12/1991 | Okazaki et al. | 428/323 |
| 5,070,180 | 12/1991 | Fukuda et al. | 528/272 |
| 5,310,787 | 5/1994 | Kutsuwa et al. | 524/513 |
| 5,340,907 | 8/1994 | Yau et al. | 528/274 |
| 5,382,652 | 1/1995 | Fukuda et al. | 528/308.6 |

FOREIGN PATENT DOCUMENTS

| | | |
|---|---|---|
| 60-253545 | 12/1985 | Japan . |
| 62-222845 | 9/1987 | Japan . |

OTHER PUBLICATIONS

EP,A,0 517 171 (Du Pont–Mitsui Polchemicals Co., Ltd.) 9 Dec. 1992; see p. 2, line 1–p. 3, line 11; see p. 5, line 14–line 31; see example 3.
WO,A,91 08107 (Eastman Kodak Company) 13 Jun. 1991; see claims 1–5; example 2; see p. 5, line 20–line 23.

*Primary Examiner*—Paul J. Thibodeau
*Assistant Examiner*—Vivian Chen
*Attorney, Agent, or Firm*—Karen A. Harding; Harry J. Gwinnell

[57] ABSTRACT

Monolayer and multilayer non-oriented polyester films comprising of at least one layer of an amorphous heat-sealing polyester wherein the heat-sealing polyester consisting essentially of terephthalic acid, ethylene glycol, and about 7–15 mol % cyclohexanedimethanol. The heat-sealing polyester has a heat of fusion greater than 0.5 cal/g and is sufficiently crystallizable to allow the drying of mixtures of the heat-sealing polyesters with other crystallizable polyesters without sticking. Multilayered films also contain a layer of an amorphous crystallizable polyethylene terephthalate.

13 Claims, No Drawings

NON-ORIENTED, HEAT-SEALING POLYESTER FILM

TECHNICAL FIELD

The present invention relates to polyester film, both monolayer and multilayer. The film comprises at least one layer of a heat-sealing polyester which is crystallizable to the extent of allowing mixtures thereof to be made with other crystallizable polyesters for crystallization without sticking. The heat-sealing polyester is polyethylene terephthalate modified with about 7–15 mol % cyclohexanedimethanol. In multilayered films, another layer of readily crystallizable polyethylene terephthalate (PET) is used.

BACKGROUND OF THE INVENTION

It is known in the art that amorphous polyesters can be extruded with crystallizable polyesters to improve performance of the film. Performance improvements over monolayer crystallizable polyester films include high temperature sealing, solvent sealing, and lower cutting force during trimming. Crystallizable polyesters used as a heat-sealing layer often results in poor performance. Amorphous polyester resins cause problems when being handled as waste material (hereinafter sometimes called "regrind") which is generated during processing. When mixed with crystalline polyester pellets and dried at a temperature above the glass transition temperature of the amorphous polyester, the regrind softens and sticks together, forming large clumps. These clumps make drying of the regrind very difficult and cause significant problems with air flow in a dryer and also when feeding to an extruder.

Some techniques for overcoming this sticking problem include melting the regrind with crystallizable polyesters using devices specially equipped for this process and then reforming the extrudate into pellets that can later be thermally crystallized. Although this technique may alleviate the sticking problems, the cost can be relatively expensive.

This invention provides a polyester composition which offers advantages due to its heat-sealability, while at the same time crystallize to sufficient levels to allow mixing and drying with crystallizable polyesters.

Polyesters containing repeat units from terephthalic acid, ethylene glycol and cyclohexanedimethanol are known in the art. For example, see U. S. Pat. Nos. 4,373,002; 4,091,150; 4,405,400; 4,011,358; 4,765,999; 4,399,179; 4,946,743; 4,375,494 and 2,901,466. Some of the films disclosed in these patents are oriented. In others, the heat-sealing layer is not as described and claimed herein. For example, U.S. Pat. No. 4,765,999 discloses a dual layered film wherein the heat-sealing layer is a polyester having repeat units from terephthalic acid, ethylene glycol and 1,4-cyclohexanedimethanol. This heat-sealing polyester contains a greater number of repeat units from 1,4-cyclohexanedimethanol than claimed herein, making the heat-sealing layer too difficult to crystallize and thus, would result in sticking when mixed with other polyesters during crystallization.

Japanese Patent 62,222,845 discloses a laminated heat-sealable polyester film comprised of (1) a crystallizable PET containing up to 10 mol % of comonomer that has a heat of fusion of at least 7 cal/g and (2) a PET copolymer containing 10–20 mol % isophthalic acid that has a heat of fusion of up to 5 cal/g. The film is oriented and used for pouches for boiling food for sterilization. An important relation between the layers is the refraction index. A preferred range is disclosed for optimum properties. This patent does not address regrind nor the crystallizability of the second layer. Furthermore, it does not mention the use of PET copolymers containing 1,4-cyclohexanedimethanol.

Japanese Patent 60,253,545 discloses a laminated polyester film for shrink-packaging comprised of (1) a copolyester modified with 5 to 50 mol % 1,4-cyclohexanedimethanol and (2) PET. The total thickness of the copolyester layer is 20–70% of the entire structure. An important property of the film is shrinkage. Again, this patent does not address regrind nor the crystallizability of the copolyester layer.

DESCRIPTION OF THE INVENTION

According to one embodiment of this invention, there is provided a non-oriented film of an amorphous, heat-sealing, slowly crystallizable polyester consisting essentially of repeat units from terephthalic acid, about 85–93 mol % ethylene glycol and about 15–7 mol % cyclohexanedimethanol.

According to another embodiment of the invention, there is provided a non-oriented film comprising a) a first amorphous crystallizable polyester layer consisting essentially of polyethylene terephthalate having a melting point greater than about 238° C., a heat of fusion of greater than about 9 cal/g as measured by a differential scanning calorimeter using a scan rate of about 20° C./min, an I.V. of about 0.50 dL/g to about 1.00 dL/g, and b) a second amorphous, heat-sealing polyester layer having an I.V. of about 0.50 dL/g to about 0.90 dL/g and wherein said heat-sealing polyester consists essentially of repeat units from terephthalic acid, about 85–93 mol % ethylene glycol and about 15–7 mol % cyclohexanedimethanol, said heat-sealing polyester having a heat of fusion of greater than about 0.5 cal/g as measured by a differential scanning calorimeter using a scan rate of about 20° C./min, the total thickness of said second heat-sealing polyester layer being less than about 50% of the total thickness of said film.

The monolayer film described above is useful in that it is readily heat-sealable to various substrates such as paper, paperboard, plastic, metal and wood, but at the same time is slowly crystallizable such that it can be reground or chopped into particles and crystallized with virgin material to an extent that sticking of particles is not a problem. It is useful as packaging material, such as in fabricated boxes, food trays and blister packaging. The film may be used as such or may be molded, thermoformed, or the like to make articles such as trays. Also, it may be extruded or coextruded directly into mold cavities. It has been discovered that the properties of heat-sealability and crystallizing ability can be carefully balanced by providing a polyester consisting essentially of repeat units from terephthalic acid, about 85–93 mol % ethylene glycol and about 15–7 mol % cyclohexanedimethanol. Below about 7 mol % cyclohexanedimethanol, the polyester becomes too readily crystallizable, and heat-sealability is adversely affected. Above about 15 mol % cyclohexanedimethanol, the polyester becomes too difficult to crystallize, and has a tendency to stick when crystallization with other polyester particles is attempted. For example, polyethylene terephthalate modified with 3.5 mol % 1,4-cyclohexanedimethanol is too readily crystallizable and heat-sealability is poor. On the other hand, polyethylene terephthalate modified with about 30 mol % 1,4-cyclohexanedimethanol is so difficult to crystallize, sticking problems are encountered when crystallization with other polyesters is attempted.

In multilayered structures, the layer which is essentially polyethylene terephthalate provides strength, support, and potentially lower cost to the film. By "essentially polyethylene terephthalate", it is meant polyethylene terephthalate homopolymer or a copolymer having up to a total of about 10 mol % repeat units from one or more other conventional dicarboxylic acids, glycols, or combinations thereof. Included as examples of the more conventional acids are terephthalic acid, isophthalic acid, naphthalene dicarboxylic acid, cyclohexanedicarboxylic acid and the like or their alkyl esters. Included as examples of the more conventional glycols are diethylene glycol, butanediol, hexanediol, neopentyl glycol, etc.

The cyclohexanedimethanol may be 1,4- or 1,3-isomers and may be cis, trans, or a mixture thereof. The polyesters may be mixtures of polyesters achieving the aforementioned level of cyclohexanedimethanol.

The readily crystallizable polyester and the heat-sealing polyester are produced by esterification and polycondensation techniques well known in the art. By the term "polyester", we intend to include copolyester.

The "crystallizable polyester", as defined by this invention, is further characterized by having a melting point greater than about 238° C. and a melt heat of fusion of greater than about 9 cal/g as measured by a differential scanning calorimeter, using a scan rate of about 20° C./min. The monolayer film may be produced by conventional extrusion or casting techniques. The multilayered films may be produced by conventional coextrusion, lamination, or the like. The readily crystallizable layer may have a layer of the heat-sealable layer applied to one or both sides. The film may be of any convenient thickness, but total thickness will normally be between about 5 and about 50 mil. Normally, the heat-sealing polyester in multilayered films will account for about 5–50% of the total thickness of the film.

EXAMPLES

The following examples are submitted for a better understanding of the invention.

In the examples, "Polyester A" is polyethylene terephthalate modified with about 1.5 mol % 1,4-cyclohexanedimethanol, a readily crystallizable copolyester having an I.V. of about 0.76 dL/g. "Polyester B" is a copolyester having repeat units from terephthalic acid, about 90 mol % ethylene glycol and about 10 mol % 1,4-cyclohexanedimethanol, a slowly crystallizable copolyester having good heat sealability and an I.V. of about 0.68 dL/g. "Polyester C" is a crystallizable polyester having an I.V. of about 0.76 dL/g, and having repeat units from terephthalic acid, 96.5 mol % ethylene glycol and 3.5 mol % 1,4-cyclohexanedimethanol. "Polyester D" is essentially non-crystallizable, has an I.V. of 0.75 dL/g and has repeat units from terephthalic acid, about 70 mol % ethylene glycol and about 30 mol % 1,4-cyclohexanedimethanol.

The first 11 examples were prepared with a 3.5" Welex (main) extruder and a 1.5" Davis Standard (satellite) extruder in conjunction with a 3 layer Dow feed block.

Example 1

A 10 mil film was extruded from Polyester A. One mil (0.001") of Polyester B was coextruded on each side of the 10 mil structure.

A control sample was also prepared by coextruding 1 mil of Polyester C on each side of the 10 mil film.

The film structures were then evaluated for high temperature heat sealing properties. The test consisted of sealing films to themselves using a heated bar at 375° F. for 2 seconds with 60 psi bar pressure. Samples were cut to produce a one inch by 4 inch test specimen. Bond strengths were determined using an Instron tensile testing machine to pull the bonded specimens at a 180° angle. The results, measured in grams/mm, unexpectantly indicated about a 30 % improvement in peel strength with samples made from the coextruded modified polyester as compared to the control (125.3 g/nun versus 96.1 g/mm).

Example 2

An 8-mil film was extruded from Polyester A. Two mils (0,002") of Polyester B, as described in Example 1, were coextruded on each side of the 8-mil structure.

A control sample was also prepared by coextruding 2 mils of Polyester C on each side of the 8-mil film.

The films were heat sealed and tested as described in Example 1. The coextruded modified copolyester, unexpectedly, had about a 50% higher peel strength as compared to the control sample (207.6 g/mm versus 137.3 g/mm).

Example 3

A 6-mil film was extruded from Polyester A. Three mils (0,003") of Polyester B, as described in Example 1, were coextruded on each side of the 6-mil structure.

A control sample was also prepared by coextruding 3 mils of Polyester C on each side of the 6-mil film.

The films were heat sealed and tested as described in Example 1. The coextruded modified copolyester, surprisingly, had about a 290% higher peel strength as compared to the control sample (193.4 g/mm versus 49.5 g/mm). This significant increase in peel strength was totally unexpected.

Example 4

Films were coextruded as described in Example 1. A control sample was also prepared as described in Example 1.

The film structures were then evaluated for high temperature heat sealing properties. The test consisted of sealing the films to 10 mil substrates made from Polyester D using a heated bar at 375° F. for 2 seconds with 60 psi bar pressure. Samples were cut to produce a one-inch by 4-inch test specimen. Bond strengths were determined using an Instron tensile testing machine to pull the bonded specimens at a 180° angle. The results, measured in grams/mm, unexpectantly indicated about a 32% improvement in peel strength with samples made from the coextruded modified polyester, as described in this invention, as compared to the control (141.4 g/mm versus 107.3 g/mm).

Example 5

Films were coextruded as described in Example 2. A control sample was also prepared as described in Example 2. The films were heat sealed and tested as described in Example 4. The results unexpectantly showed about a 36% increase in peel strength with samples made from the coextruded modified polyester, as described in this invention, as compared to the control (136.5 g/mm versus 100.4 g/mm).

Example 6

Films were coextruded as described in Example 3. A control sample was also prepared as described in Example 3. The films were heat sealed and tested as described in Example 4. The results surprisingly showed about a 327% increase in peel strength with samples made from the coextruded modified polyester, as described in this invention, as compared to the control (168.8 g/mm versus 39.5 g/mm). This significant increase in peel strength was totally unexpected.

Example 7

A 10-mil film was extruded from Polyester A, a crystallizable polyester. One mil (0.001") of Polyester B was coextruded on each side of the 10-mil film. A control sample was also prepared as described in Example 1.

The films were heat sealed and tested as described in Example 1. The results unexpectedly showed about a 55% increase in peel strength with samples made from the coextruded modified polyester, as described in this invention, as compared to the control (148.8 g/mm versus 96.1 g/mm).

Example 8

A 6-mil film was extruded from Polyester A, a crystallizable polyester. Three mils (0.003") of Polyester B was coextruded on each side of the 6-mil film. A control sample was also prepared as described in Example 3.

The films were heat sealed and tested as described in Example 1. The results unexpectedly showed about a 353% increase in peel strength with samples made from the coextruded modified polyester, as described in this invention, as compared to the control (223.9 g/mm versus 49.5 g/mm).

Example 9

A 10-mil film was extruded from Polyester A. One mil (0.001") of a modified copolyester, containing about 100 mol % terephthalic acid, about 85 mol % ethylene glycol and about 15 mol % 1,4-cyclohexanedimethanol, was coextruded on each side of the 10-mil film. A control sample was also prepared as described in Example 1.

The films were heat sealed and tested as described in Example 4. The results unexpectedly showed about a 99% increase in peel strength with samples made from the coextruded modified polyester, as described in this invention, as compared to the control (213.5 g/mm versus 107.3 g/mm).

Example 10

A 6-mil film was extruded from Polyester A. Three mils (0.003") of a modified copolyester, as described in Example 9, was coextruded on each side of the 6-mil film. A control sample was also prepared as described in Example 3.

The films were heat sealed and tested as described in Example 4. The results unexpectedly showed about a 252% increase in peel strength with samples made from the coextruded modified polyester, as described in this invention, as compared to the control (139.0 g/mm versus 39.5 g/mm).

Example 11

Film samples as prepared in Example 1, with a control sample consisting of Polyester A, coextruded with an amorphous copolyester (Polyester D), were put through a regrind operation for the purpose of conducting drying evaluations. The regrind had a bulk density of 15–22 lb/ft$^3$, compared to 55 lb/ft$^3$ for virgin crystallizable polyester pellets, which have already been crystallized. Regrind from each film sample was tumble blended with the virgin crystallizable polyester pellets, using a 50/50 weight ratio of regrind to pellets in the mixture. A ConAir crystallizer/dryer hopper utilizing desiccant air at 300° F. was used to evaluate the drying and recrystallizing of the amorphous regrind mixed with virgin crystallizable polyester pellets. The evaluation unexpectedly showed that modified copolyesters that show a melting heat of fusion greater than 0.5 cal/g (as measured in a DSC at 20° C./min) will not stick in a dynamic dryer set at crystalline polyester drying temperatures. The highly modified control regrind sample, which showed no melting heat of fusion, stuck together and prevented plug flow of the material through the hopper, which is highly undesirable.

Example 12

Single layer films were prepared using a 3.5" Welex extruder and a 3 roll stack nip polish take-up unit. The films were 50 mils (0.050") in thickness and consisted of the modified copolyester, containing about 100 mol % terephthalic acid, about 88 mol % ethylene glycol and about 12 mol % 1,4-cyclohexanedimethanol, and Polyester C as the control.

An internal test has been developed to measure the force and energy required to cut through a plastic film sample. An Instron tensile/compression testing machine has been outfitted with a compression load cell and a jig to hold a typical steel rule blade. The blade is pushed into the plastic while the force is monitored. Results of this test unexpectedly showed that it took about 9% less force and about 16% less energy for the modified polyester to be cut, as compared to the control (753 lb versus 826 lb and 1.51 ft-lb versus 1.79 ft-lb).

Inherent viscosity (I.V.) is determined herein using 0.50 grams of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

We claim:

1. A non-oriented layered film comprising
   a) a first amorphous crystallizable polyester layer consisting essentially of polyethylene terephthalate having a melting point greater than about 238° C. and a heat of fusion of greater than about 9 cal/g as measured by a differential scanning calorimeter using a scan rate of about 20° C./min, and
   b) a second amorphous, heat-sealing polyester layer consisting essentially of repeat units from terephthalic acid, about 85–93 mol % ethylene glycol and about 15–7 mol % cyclohexanedimethanol, said second polyester having a heat of fusion of greater than about 0.5 cal/g as measured by a differential scanning calorimeter using a scan rate of about 20° C./min, the total thickness of said second polyester layer being less than about 50% of the total thickness of said film.

2. The film according to claim 1 wherein said heat-sealing layer is present on both sides of said first polymer layer.

3. The film according to claim 2 wherein said second polyester layer is about 5% to less than about 50% of the total thickness of said film.

4. The film according to claim 1 wherein said second polyester layer is about 5% to less than about 50% of the total thickness of said film.

5. The film according to claim 1 wherein said second heat-sealing polyester layer consists essentially of repeat units from terephthalic acid, about 87–91 mol % ethylene glycol and about 13–9 mol % cyclohexanedimethanol.

6. A package comprising the film according to claim 1.

7. A molded article comprising the film of claim 1.

8. The film according to claim 1 wherein said layers are coextruded.

9. The film according to claim 1 wherein at least one of said layers is preformed and the other layer is applied to the preformed layer as a coating.

10. A non-oriented polyester film consisting essentially of an amorphous, heat-sealing polyester wherein said heat-sealing polyester consists essentially of repeat units from terephthalic acid, about 85–93 mol % ethylene glycol and about 15–7 mol % cyclohexanedimethanol wherein said heat-sealing polyester has a heat of fusion of greater than about 0.5 cal/g as measured by a differential scanning calorimeter using a scan rate of about 20° C./min.

11. The film according to claim 10 wherein said second heat-sealing polyester consists essentially of repeat units from terephthalic acid, about 87–91 mol % ethylene glycol and about 13–9 mol % cyclohexanedimethanol.

12. A package comprising the film according to claim 10.

13. A molded article comprising the film of claim 10.

* * * * *